United States Patent
Hutchmacher

[19]

[11] Patent Number: 5,158,316
[45] Date of Patent: Oct. 27, 1992

[54] TRAILER HITCH EXTENSION APPARATUS

[76] Inventor: Charles A. Hutchmacher, 3561 Murphy Rd., Fayetteville, N.C. 28301

[21] Appl. No.: 780,965

[22] Filed: Oct. 23, 1991

[51] Int. Cl.$^5$ .......................... B60D 1/07; B60Q 1/24
[52] U.S. Cl. ............................... 280/415.1; 280/420; 280/511; 362/32; 362/83.3
[58] Field of Search ............... 280/495, 500, 504, 511, 280/760, 406.1, 407, 416.1, 456.1, 491.5, 477, 420; 362/32, 80, 82, 83.2, 83.3

[56] References Cited

U.S. PATENT DOCUMENTS

| | | | |
|---|---|---|---|
| D. 296,886 | 7/1988 | Young, Jr. | D12/162 |
| 2,911,233 | 11/1959 | Riddle | 280/511 X |
| 4,456,279 | 6/1984 | Dirck | 280/511 X |
| 4,807,900 | 2/1989 | Tate | 280/416.1 X |
| 5,044,652 | 9/1991 | Brisson | 280/511 X |

*Primary Examiner*—Charles A. Marmor
*Assistant Examiner*—Jeffrey A. Kuta

*Attorney, Agent, or Firm*—Leon Gilden

[57] ABSTRACT

A plate member is formed of a generally triangular configuration, with a rear edge arranged for mounting to an associated vehicular bumper, including a central opening and spaced, longitudinally aligned slots positioned on opposed sides of the central opening for permitting lateral adjustment of the plate relative to the bumper upon removal of a central fastener directed relative to the central bore. A plurality of openings mounted through the plate adjacent a forward apex of the plate are arranged for multiple positioning of a trailer hitch ball. A modification of the invention includes the selector plate arranged for selective mounting through a forward opening adjacent the apex, wherein the selector plate includes a plurality of trailer hitch ball members for securement to a respective trailer hitch ball permitting selective rotation of the selector plate relative to the forward opening permitting utilization of various sized trailer hitch balls.

2 Claims, 4 Drawing Sheets

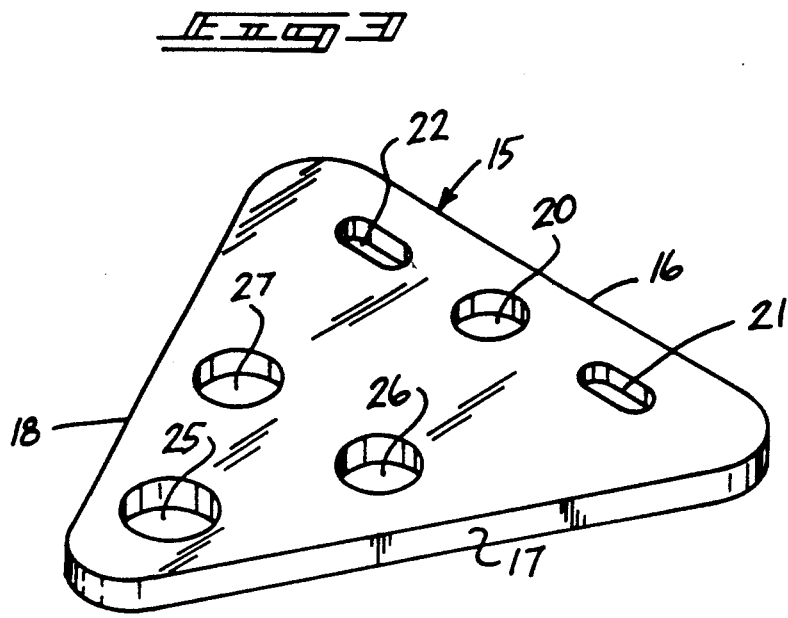
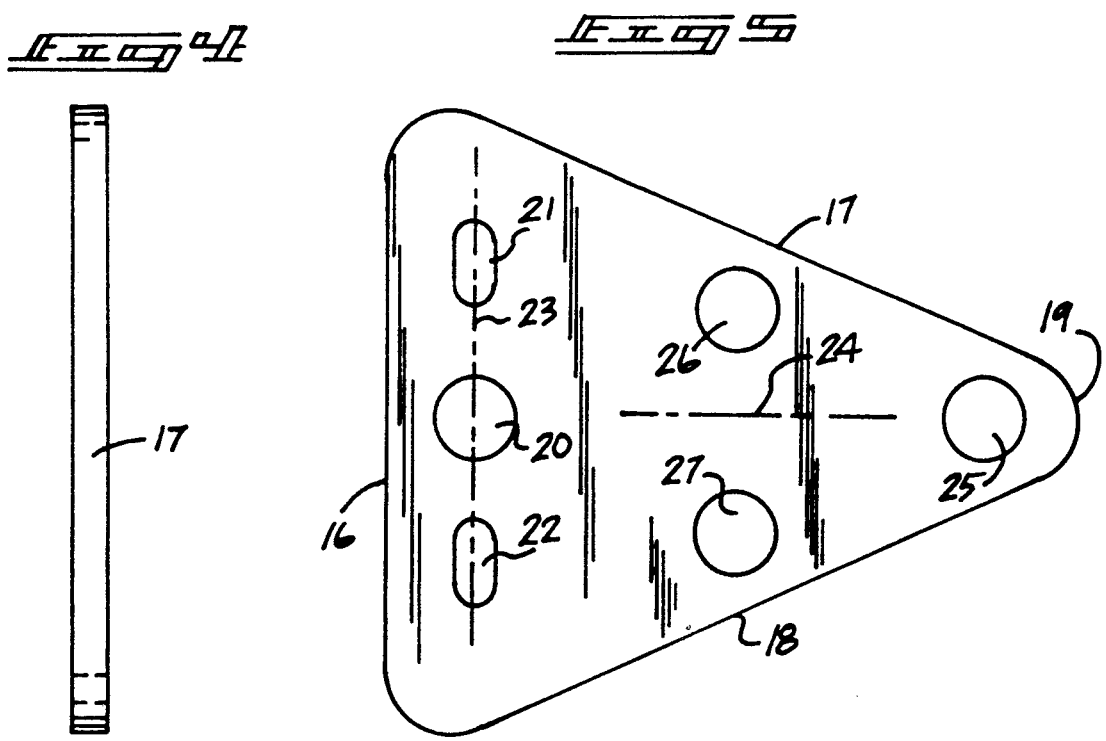

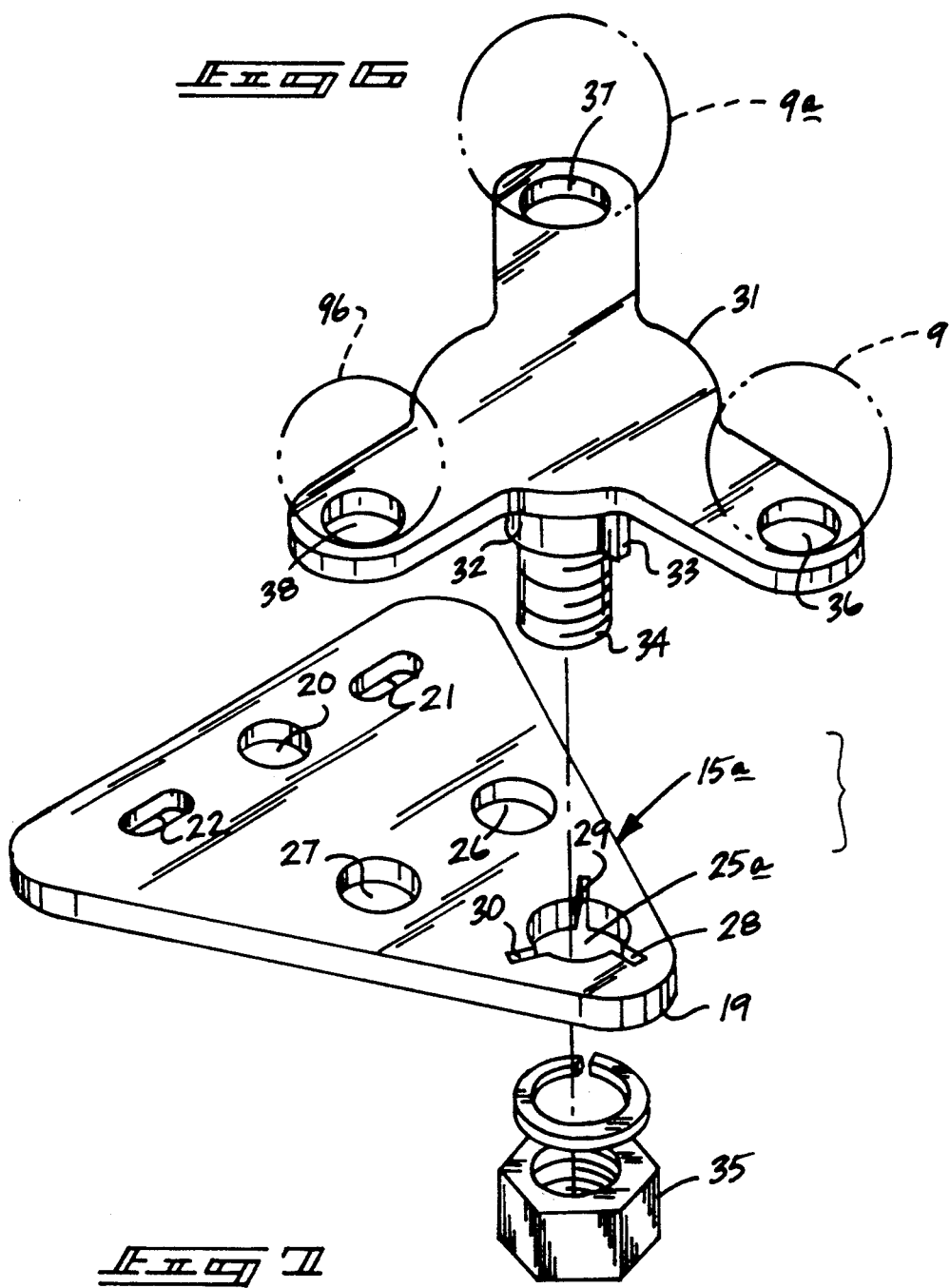
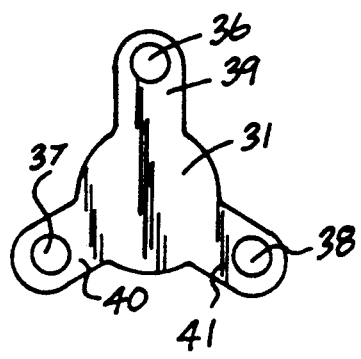
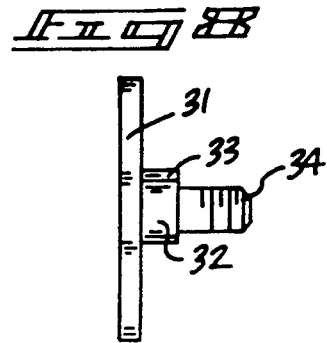

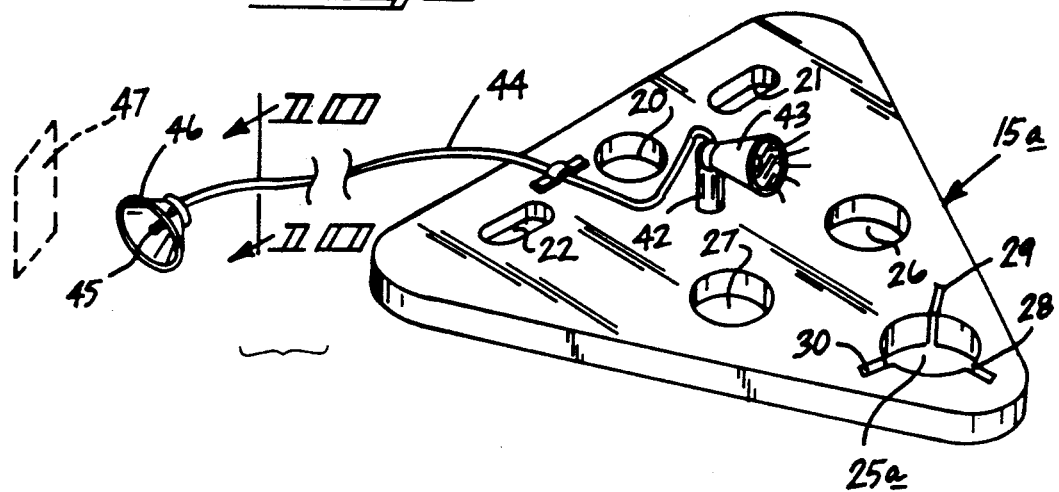
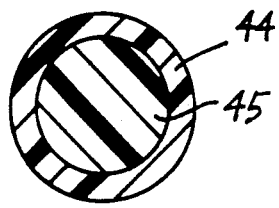
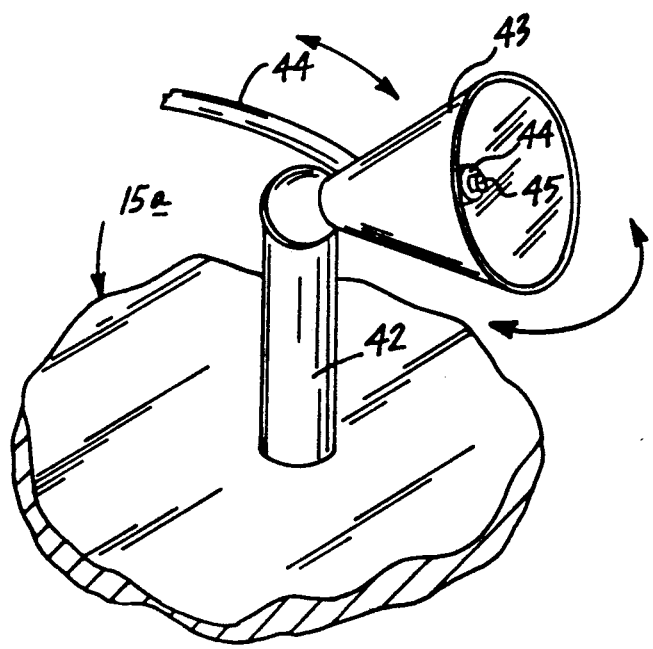

TRAILER HITCH EXTENSION APPARATUS

BACKGROUND OF THE INVENTION

1. Field of the Invention

The field of invention relates to trailer hitch apparatus, and more particularly pertains to a new and improved trailer hitch extension apparatus wherein the same is arranged to permit extension of a trailer hitch relative to an associated bumper for providing requisite clearance of a trailer tongue relative to the bumper structure.

2. Description of the Prior Art

Various trailer hitch apparatus is utilized throughout the prior art in the securement and mounting of a trailer relative to a tow vehicle. At times it is required to permit the utilization of trailer members whose tongues are of various configurations, as well as associated trailers wherein clearance is required in the towing of such trailer structure.

Typical prior art structure in the trailer hitch environment is set forth for example in U.S. Pat. No. 296,886 to Young, Jr. wherein a trailer hitch extension plate includes a plurality of openings directed through the rear edge of the plate structure with a plurality of forward openings mounted adjacent a forward apex portion of the structure.

U.S. Pat. No. 3,521,908 to Carter sets forth a trailer hitch utilizing a forward extension leg pivotally mounted relative to the trailer hitch structure to permit self-alignment of the trailer hitch relative to the associated trailer.

As such, it may be appreciated that there continues to be a need for a new and improved trailer hitch extension apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of trailer hitch apparatus now present in the prior art, the present invention provides a trailer hitch extension apparatus wherein the same is arranged to permit spacing of a trailer hitch relative to an associated tow vehicle. As such the general purpose of the present invention, which will be described subsequently in greater detail, is to provide a new and improved trailer hitch extension apparatus which has all the advantages of the prior art trailer hitch apparatus and none of the disadvantages.

To attain this, the present invention provides a plate member formed of a generally triangular configuration, with a rear edge arranged for mounting to an associated vehicular bumper, including a central opening and spaced, longitudinally aligned slots positioned on opposed sides of the central opening for permitting lateral adjustment of the plate relative to the bumper upon removal of a central fastener directed relative to the central bore. A plurality of openings mounted through the plate adjacent a forward apex of the plate are arranged for multiple positioning of a trailer hitch ball. A modification of the invention includes the selector plate arranged for selective mounting through a forward opening adjacent the apex, wherein the selector plate includes a pluality of trailer hitch ball members for securement to a respective trailer hitch ball permitting selecting rotation of the selector plate relative to the forward opening permitting utilization of various sized trailer hitch balls.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the techincal disclosure of the application. The abstract is neither intended to define the invention of the application, which is measured by the claims, nor is it intended to be limiting as to the scope of the invention in any way.

It is therefore an object of the present invention to provide a new an improved trailer hitch extension apparatus which has all the advantages of the prior art trailer hitch apparatus and none of the disadvantages.

It is another object of the present invention to provide a new and improved trailer hitch extension apparatus which may be easily and efficiently manufactured and marketed.

It is a further object of the present invention to provide a new and improved trailer hitch extension apparatus which is of a durable and reliable construction.

An even further object of the present invention is to provide a new and improved trailer hitch extension apparatus which is susceptible of a low cost of manufacture with regard to both materials and labor, and which accordingly is then susceptible of low prices of sale to the consuming public, thereby making such trailer hitch extension apparatus economically available to the buying public.

Still yet another object of the present invention is to provide a new and improved trailer hitch extension apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isometric illustration of the instant invention. FIG. 4 is an orthographic side view of the instant invention.

FIG. 5 is an orthographic top view of the instant invention.

FIG. 6 is an isometric illustration of a modified apparatus utilized by the invention.

FIG. 7 is an orthographic top view of the selector plate utilized by the invention, as set forth in FIG. 6.

FIG. 8 is an orthographic side view of the selector plate structure.

FIG. 9 is an isometric illustration of a further modified aspect of the invention.

FIG. 10 is an orthographic view, taken along the lines 10—10 of FIG. 9 in the direction indicated by the arrows.

FIG. 11 is an enlarged isometric illustration of the illumination structure utilized in the apparatus as set forth in FIG. 9.

DESCRIPTION OF THE PREFERRED EMBODIMENT

Figure 1:
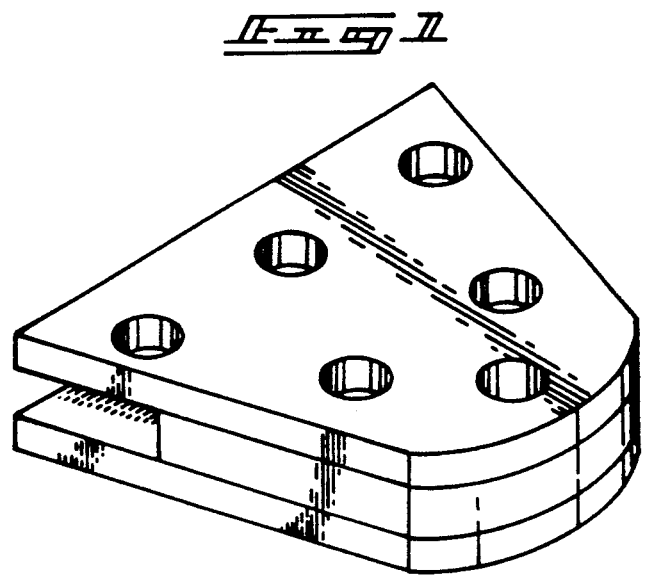
FIG. 1 is an isometric illustration of a prior art trailer hitch extension apparatus.
Figure 2:
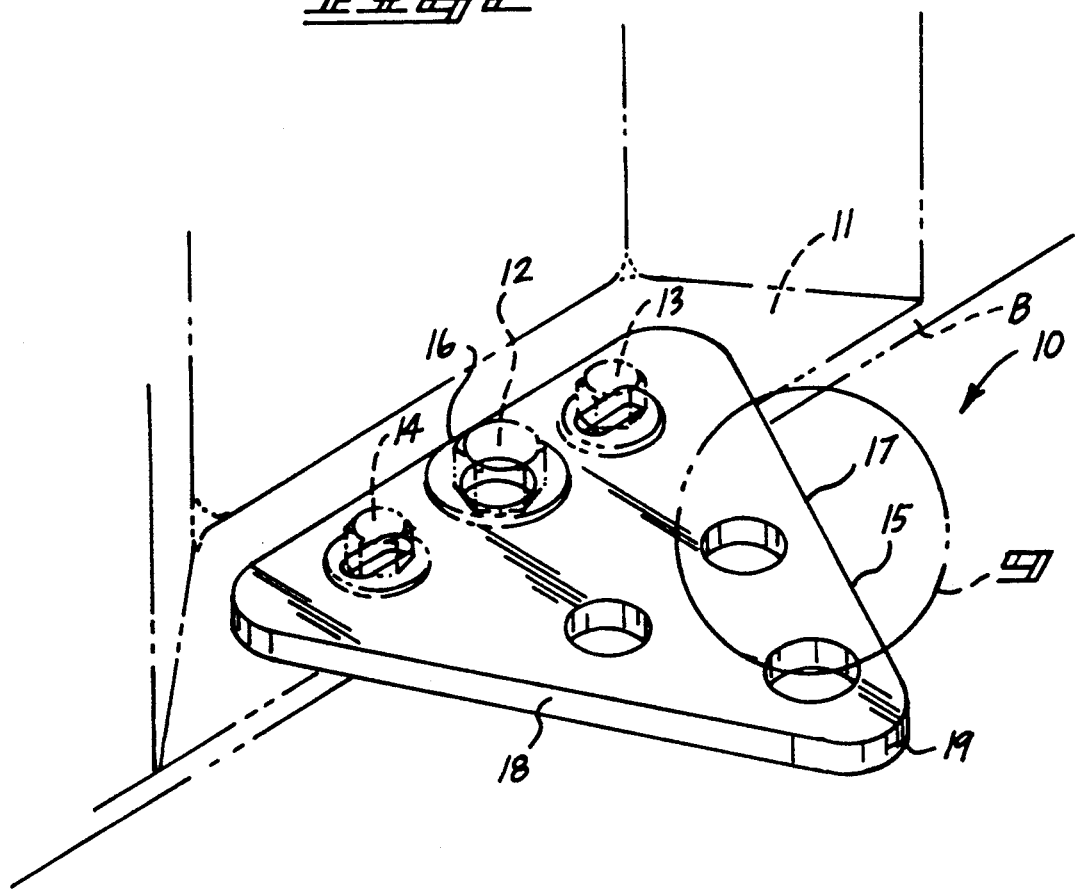
FIG. 2 is an isometric illustration of the instant invention mounted to an associated tow vehicle bumper.

With reference now to the drawings, and in particular to FIGS. 1 to 11 thereof, a new and improved trailer hitch extension apparatus embodying the principles and concepts of the present invention and generally designated by the reference numeral 10 will be described.

The prior art structure, as illustrated in FIG. 1, is presented in the U.S. Pat. No. 296,886 illustrating the annual bore projected through the flange structure adjacent the rear edge thereof.

More specifically, the trailer hitch extension apparatus 10 of the instant invention essentially comprises an extension plate 15 of a generally triangular configuration, including securement to an associated bumper "B" that is formed with a bumper flange 11. A medial fastener 12 with a plurality of right and left fasteners 13 and 14 respectively are directed through the extension plate 15 for securement to the bumper flange 11. A rear edge 16 is formed relative to the extension plate in association with a right edge 17 and a left edge 18 to define an equilateral triangle whose rear edge, right edge, and left edge are of equal length. Alternatively, the organization may be formed as an isosceles triangle whose right and left edges are of an equal length relative to the rear edge 16. A frontal apex 19 is defined by the junction of the right and left edges 17 and 18. A first bore 20 is directed through the plate 15 medially of and adjacent the rear edge 16, with a right slot 21 and a left slot 22 that are longitudinally aligned relative to one another and aligned along the longitudinal axis 23 diametrically intersecting the medially oriented first bore 20 positioned medially between the right and left slots 21 and 22 is arranged to permit removal of the medial fastener 12 relative to the right and left fasteners 13 and 14 to permit lateral positioning of the plate relative to the bumper flange 11. The first longitudinal axis 23, as illustrated in the FIG. 5, medially intersects the first bore 20, the right slot 21, and the left slot 22 in a spaced parallel relationship relative to the rear edge 16, and is orthogonally intersected by a second longitudinal axis 24 medially bisecting an included angle defined between the right and left edges 17 and 18 at the frontal apex 19 and simultaneously bisecting the first bore 20. A forward first bore 25 is diametrically bisected by the second longitudinal axis 24 positioned adjacent the frontal apex 19 and cooperates with a forward second bore 26 positioned adjacent the right edge 17 between the forward first bore 25 and the right slot 21, and a third bore 27 adjacent the left edge 18 between the forward first bore 25 and the left slot 22. The bores 25–27 are arranged to mount a mounting ball 9 in various positions relative to the plate 15 for selective positioning of an associated trailer hitch (not shown) relative to the bumper "B".

The FIGS. 6–8 illustrate the use of a modified extension plate 15a of a type as described above, but wherein a modified forward bore 25a is utilized. The modified forward bore 25a includes a respective first, second, and third radial slot 28, 29, and 30 respectively in communication with a bore 25a radially aligned relative to the bore 25a projecting exteriorly thereof into the plate 15a spaced apart an equal spacing relative to one another. A selection plate 31 is provided formed with an alignment boss 32 coaxially and integrally mounted to a bottom surface of the selection plate 31, to include a single boss flange 33 radially aligned with the generally cylindrical boss 32 and selectively received within one of said first, second, and third radial slots 28, 29 and 30. In this manner, the selection plate is rotated relative and fixedly secured within the bore 25a to include a fastener 35 securable to a threaded extension 34 coaxially projecting relative to the boss 32. A first flange 39 coplanar with the selection plate 31 extends exteriorly of the plate 31 and is aligned with the flange 33. A second and third respective flange 40 and 41 are provided, each radially directed exteriorly and coplanar with the selection plate 31 spaced apart an equal spacing relative to one another. It should be noted that an equal spacing or angular displacement of the slots 28, 29, and 30 and the flanges 39, 40, and 41 are each equal to approximately 120 degrees in a radial spacing relative to one another. Each of the first, second, and third flanges includes respective first, second, and third trailer ball receiving bore 36, 37, and 38 to mount a respective first, second, and third mounting ball 9, 9a, and 9b respectively. The mounting balls 9, 9a, and 9b are of various diameters to accommodate various trailer hitch sockets permitting the use of the selector plate in mounting and receiving a trailer hitch without resort to changing of an associated ball member, but are utilized by the mere rotation of the selector plate 31 in accommodating various trailer hitch sockets.

The apparatus of the FIGS. 9–11 illustrate the modified plate structure 15a to include a support post 42 mounted orthogonally to a top surface of the plate rearwardly of the modified forward first bore 25a, the forward second bore 26, and the forward third bore 27, with the support post 42 including a reflector housing 43 pivotally mounted to an upper terminal end of the post 42. A flexible sheath 44 includes a fiber optic cable 45 coextensive therethrough, with a fiber optic cable forward distal end projecting within the reflector housing 43 and an rear distal end of the fiber optic cable 45 directed coaxially through a suction cup 46. The suction cup 46 is arranged for adherence to an exterior surface of a vehicular light cover 47, whereupon during conditions of limited available light upon mounting of the suction cup 46 to the light cover 47, light is directed through the fiber optic cable 47 and with the pivotal mounting of the housing 43, the forward distal end of the fiber optic cable 45 is directed upon one of the bores 25a, 26, and 27 for enhanced illumination and utilization of the apparatus during conditions of limited available light.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A trailer hitch extension apparatus arranged for use in combination with a vehicular bumper, the vehicular bumper positioned adjacent a vehicular trail light including a light cover, the apparatus comprising, an extension plate, the extension plate formed of a triangular configuration, including a right edge and a left edge merging together at a frontal apex, with the right edge and the left edge of an equal predetermined length, and a rear edge joined to the right edge and left edge spaced from the frontal apex, and a first bore directed through the extension plate adjacent the rear edge medially of the rear edge, and a right slot positioned to a first side of the first bore, and left slot positioned to a left side of the first bore, wherein the right slot, the left slot, and the first bore are longitudinally aligned along a first longitudinal axis, wherein the first longitudinal axis medially bisects the left slot, the right slot, and the first bore and is arranged parallel to and spaced from the rear edge, and a second longitudinal axis positioned medially between the right edge and the left edge orthogonally bisects the first longitudinal axis, and a forward first bore is directed through the extension plate adjacent the frontal apex, and a forward second bore is positioned adjacent the frontal first bore and adjacent the right edge, and a forward third bore is positioned adjacent the frontal first bore adjacent the left edge, and the forward first bore includes a first radial slot, a second radial slot, and a third radial slot, with each radial slot in communication with the forward first bore and radially aligned with the forward first bore projecting exteriorly of the forward first bore, and the first radial slot is aligned with the second longitudinal axis, and a selection plate, the selection plate including an alignment boss integrally and orthogonally mounted to a bottom surface of the selection plate, the alignment boss including a single boss flange radially projecting exteriorly of the alignment boss for selective reception within one of said first, second, and third radial slots, and a threaded extension coaxially aligned with the alignment boss extending below the alignment boss for projection through the forward first bore and including a fastener selectively securable to the threaded extension to capture the extension plate between the fastener and the selection plate, and ball receiving means mounted in the selection plate for mounting a plurality of mounting balls thereto, and the ball receiving means includes a first flange coplanar with the selection plate extending radially and exteriorly of the selection plate aligned with the flange, and a second flange and a third flange coplanar with the selection plate radially spaced an equal distance relative to one another, and the first flange including a first trailer ball receiving bore directed therethrough, the second flange including a second trailer ball receiving bore directed therethrough, and the third flange including a third trailer ball receiving bore directed therethrough, and the first trailer ball receiving bore, the second trailer ball receiving bore, and the third trailer ball receiving bore arranged for mounting of a first, second, and third respective mounting ball thereto permitting selective use of the first, second, and third mounting balls for securement of a trailer tongue selectively to one of said mounting balls.

2. An apparatus as set forth in claim 1 including a support post integrally and orthogonally mounted to a top surface of the selection plate, with the support post including a reflector housing pivotally mounted relative to an upper terminal end of the support post, and a flexible sheath directed into the reflector housing and extending exteriorly thereof, wherein a fiber optic cable is directed coextensively through the flexible sheath and extends exteriorly thereof within the reflector housing, and a rear terminal end of the fiber optic cable is directed through a rear terminal end of the flexible sheath, and a suction cup secured to the sheath radially directing the sheath therethrough, and the suction cup arranged for mounting to the vehicular light cover for directing light through the fiber optic cable and into the reflector housing for selective illumination of said selection plate.

* * * * *